United States Patent
Braley (10) Patent No.: US 11,391,825 B2
(45) Date of Patent: Jul. 19, 2022

(54) SENSOR CALIBRATION PARAMETER SENSITIVITY ANALYSIS

(71) Applicant: Waymo LLC, Mountain View, CA (US)

(72) Inventor: Colin Andrew Braley, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 611 days.

(21) Appl. No.: 16/460,696

(22) Filed: Jul. 2, 2019

(65) Prior Publication Data

US 2021/0003682 A1 Jan. 7, 2021

(51) Int. Cl.
| | |
|---|---|
| *G01S 7/497* | (2006.01) |
| *G06N 3/08* | (2006.01) |
| *G01S 7/48* | (2006.01) |
| *G05D 1/02* | (2020.01) |
| *G01S 17/931* | (2020.01) |

(52) U.S. Cl.
CPC ............ *G01S 7/497* (2013.01); *G01S 7/4802* (2013.01); *G06N 3/08* (2013.01); *G01S 17/931* (2020.01); *G05D 1/0221* (2013.01); *G05D 1/0231* (2013.01)

(58) Field of Classification Search
CPC ...... G01S 17/86; G01S 17/931; G01S 7/4802; G01S 7/497; G06N 3/08; G06N 3/084; G05D 1/0221; G05D 1/0231
USPC .......................................................... 702/97
See application file for complete search history.

(56) References Cited

U.S. PATENT DOCUMENTS

| | | | |
|---|---|---|---|
| 9,534,924 B2 * | 1/2017 | Ahuja | G01C 25/00 |
| 10,775,488 B2 * | 9/2020 | Bradley | G01S 7/4815 |
| 2018/0067198 A1 * | 3/2018 | Valois | G01S 7/497 |
| 2019/0056484 A1 * | 2/2019 | Bradley | G01S 7/4815 |
| 2019/0293756 A1 * | 9/2019 | Blaes | G01S 17/931 |

OTHER PUBLICATIONS

Ackerman et al, "Online Ultrasound Sensor Calibration Using Gradient Descent on the Euclidean Group," IEEE Xplore, May 2014, 6 pages.

(Continued)

*Primary Examiner* — John H Le
(74) *Attorney, Agent, or Firm* — Fish & Richardson P.C.

(57) ABSTRACT

Methods, systems, and apparatus, including computer programs encoded on a computer storage medium, for determining that prediction outputs generated by a prediction system are sensitive to variations in the values of one or more of a set of target sensor calibration parameters. In one aspect, a sensitivity analysis system is configured to perform operations comprising updating the values of one or more target sensor calibration parameters of each sensor data tuple of a plurality sensor data tuples, comprising, for each sensor data tuple: providing the sensor data tuple with the current values of the target sensor calibration parameters to the prediction subsystem to generate a current prediction output; determining a gradient of a function of the current prediction output with respect to the target sensor calibration parameters; and updating the current values of the target sensor calibration parameters of the sensor data tuple using the gradient.

20 Claims, 4 Drawing Sheets

(56) References Cited

OTHER PUBLICATIONS

Yeung et al., "Sensitivity Analysis for Neural Networks," Springer, 2010, Chapter 2: pp. 17-24.
Mordvintsev et al., "Inceptionism: Going Deeper into Neural Networks," Google A1 Blog: the latest news from google al, Jun. 17, 2015, 6 pages.

* cited by examiner

SENSOR CALIBRATION PARAMETER SENSITIVITY ANALYSIS

BACKGROUND

This specification relates to sensor calibration parameter sensitivity analysis.

Examples of sensors include camera sensors, radar sensors, and lidar sensors. Generally, raw sensor data generated by different sensors (or by the same sensor at different time points) may not be directly comparable. Raw sensor data generated by a sensor can be processed using a set of sensor calibration parameters to generate calibrated (i.e. standardized) sensor data that is comparable between different sensors and across time points.

Sensitivity analysis refers to determining which inputs to a system exert a strong influence on the outputs generated by the system, e.g., where a small change in the value of the input causes a significant change in the value of the output.

SUMMARY

This specification describes a sensitivity analysis system implemented as computer programs on one or more computers in one or more locations.

According to a first aspect there is provided a system including a prediction subsystem and a sensitivity analysis subsystem. The prediction subsystem is configured to perform operations including receiving an input sensor data tuple including: (i) a given set of raw sensor data, and (ii) values of a set of sensor calibration parameters. The prediction subsystem processes the input sensor data tuple to generate a prediction output. The sensitivity analysis subsystem is configured to perform operations including obtaining a set of sensor data tuples, where each sensor data tuple includes: (i) a set of raw sensor data, and (ii) actual values of a set of sensor calibration parameters of a sensor that generated the set of raw sensor data. At each of one or more iterations, the sensitivity analysis subsystem updates the values of one or more target sensor calibration parameters of each sensor data tuple, including, for each sensor data tuple, providing the sensor data tuple with the current values of the target sensor calibration parameters to the prediction subsystem to generate a current prediction output. The sensitivity analysis subsystem determines a gradient of a function of the current prediction output with respect to the target sensor calibration parameters. The sensitivity analysis subsystem updates the current values of the target sensor calibration parameters of the sensor data tuple using the gradient. At a final iteration of the one or more iterations, the sensitivity analysis subsystem determines that prediction outputs generated by the prediction subsystem are sensitive to variations in the values of one or more of the target sensor calibration parameters based on the current values of the target sensor calibration parameters.

In some implementations, the sensitivity analysis subsystem is further configured to, at the final iteration of the one or more iterations, determine that for at least a predetermined number of the sensor data tuples, the current prediction output generated by providing the sensor data tuple with the current values of the target sensor calibration parameters to the prediction subsystem is different than an original prediction output generated by providing the sensor data tuple with the actual values of the target sensor calibration parameters to the prediction subsystem.

In some implementations, processing the input sensor data tuple to generate a prediction output includes processing the given set of raw sensor data and the values of the set of sensor calibration parameters using a calibration model to generate a set of calibrated sensor data. An input including the set of calibrated sensor data is processed using a prediction model to generate the prediction output.

In some implementations, the prediction model is a neural network model.

In some implementations, the given set of raw sensor data is generated by a lidar sensor and includes one or more of: raw time of flight data, raw intensity data, raw lidar beam pitch angle data, and raw lidar motor angle data.

In some implementations, the set of calibrated sensor data includes one or both of: world-space position data and calibrated intensity data.

In some implementations, the prediction output is a detection output that identifies positions of objects characterized by the raw sensor data.

In some implementations, the predetermined number of sensor data tuples is a predetermined fraction of the plurality of sensor data tuples.

In some implementations, the sensitivity analysis subsystem determines that prediction outputs generated by the prediction system are sensitive to variations in the values of a particular target sensor calibration parameter based on, for each sensor data tuple, a difference between (i) the current value of the particular target sensor calibration parameter of the sensor data tuple and (ii) the actual value of the particular target sensor calibration parameter of the sensor data tuple.

In some implementations, determining that prediction outputs generated by the prediction system are sensitive to variations in the values of a particular target sensor calibration parameter includes determining that an average, over the sensor data tuples, of a magnitude of the difference between (i) the current value of the particular target sensor calibration parameter of the sensor data tuple and (ii) the actual value of the particular target sensor calibration parameter of the sensor data tuple, satisfies a threshold.

In some implementations, determining a gradient of a function of the current prediction output with respect to the target sensor calibration parameters includes determining a gradient of a similarity measure function between: (i) the current prediction output generated by providing the sensor data tuple with the current values of the target sensor calibration parameters to the prediction subsystem and (ii) an original prediction output generated by providing the sensor data tuple with the actual values of the target sensor calibration parameters to the prediction subsystem.

In some implementations, the current prediction output and the original prediction output include respective probability distributions over possible classification values. The similarity measure function between the current prediction output and the original prediction output may include a Kullback-Leibler similarity measure between the current prediction output and the original prediction output.

According to a second aspect there is provided a method performed by one or more data processing apparatus that includes the operations performed by the system of the first aspect.

According to a third aspect there are provided one or more non-transitory computer storage media storing instructions that when executed by one or more computers cause the one or more computers to perform operations including the operations of the system of the first aspect.

Particular embodiments of the subject matter described in this specification can be implemented so as to realize one or more of the following advantages.

An on-board system of a vehicle can process raw sensor data generated by a sensor system of the vehicle to generate prediction outputs that can be used, e.g., to generate planning decisions which plan the future trajectory of the vehicle. Generally, the values of the raw sensor data depend on factors specific to the sensor system of the vehicle (e.g., the temperature of the sensor system). To generate prediction outputs using the raw sensor data, the on-board system processes a set of sensor calibration parameters in addition to the raw sensor data. The prediction outputs generated by the on-board system may be particularly sensitive to the values of certain sensor calibration parameters, referred to in this specification as "sensitive" calibration parameters. This specification describes a sensitivity analysis system that can be used to identify sensitive calibration parameters.

Once the sensitivity analysis system has identified the sensitive calibration parameters, the on-board system can be "trained" (i.e., using machine learning techniques) to be more robust to variations in the values of the sensitive calibration parameters. This can improve the operation of the vehicle by enabling the on-board system to generate accurate prediction outputs even if the sensor system is poorly calibrated (i.e., the values of the sensor calibration parameters are inaccurate).

Moreover, the sensor calibration procedure used to estimate the values of the sensor calibration parameters can be modified to focus on precisely estimating the values of the sensitive calibration parameters, while allowing the values of non-sensitive calibration parameters to be estimated less precisely. Therefore, the sensitivity analysis system can improve the operation of the vehicle by increasing the precision of the values of the sensitive calibration parameters, thereby enabling the on-board system to generate more accurate prediction outputs.

The details of one or more embodiments of the subject matter of this specification are set forth in the accompanying drawings and the description below. Other features, aspects, and advantages of the subject matter will become apparent from the description, the drawings, and the claims.

DETAILED DESCRIPTION

This specification describes a prediction system that is configured to process: (i) raw sensor data generated by a sensor (e.g., a lidar sensor), and (ii) values of a set of sensor calibration parameters, to generate a prediction output. A sensitivity analysis system is configured to determine whether the prediction outputs generated by the prediction system are sensitive to variations in the values of the sensor calibration parameters provided as an input to the prediction system. In particular, the sensitivity analysis system identifies "sensitive" sensor calibration parameters having the property that "small" changes in the value of the sensor calibration parameter may cause "significant" changes in the prediction outputs generated by the prediction system, as will be described in more detail below. After the sensitive sensor calibration parameters have been identified, the prediction system can be trained to achieve greater robustness to variations in the values of the sensitive sensor calibration parameters. The prediction system, and the sensor which generates the raw sensor data processed by the prediction system, may be part of an on-board system of a vehicle. These features and other features are described in more detail below.

Figure 1:
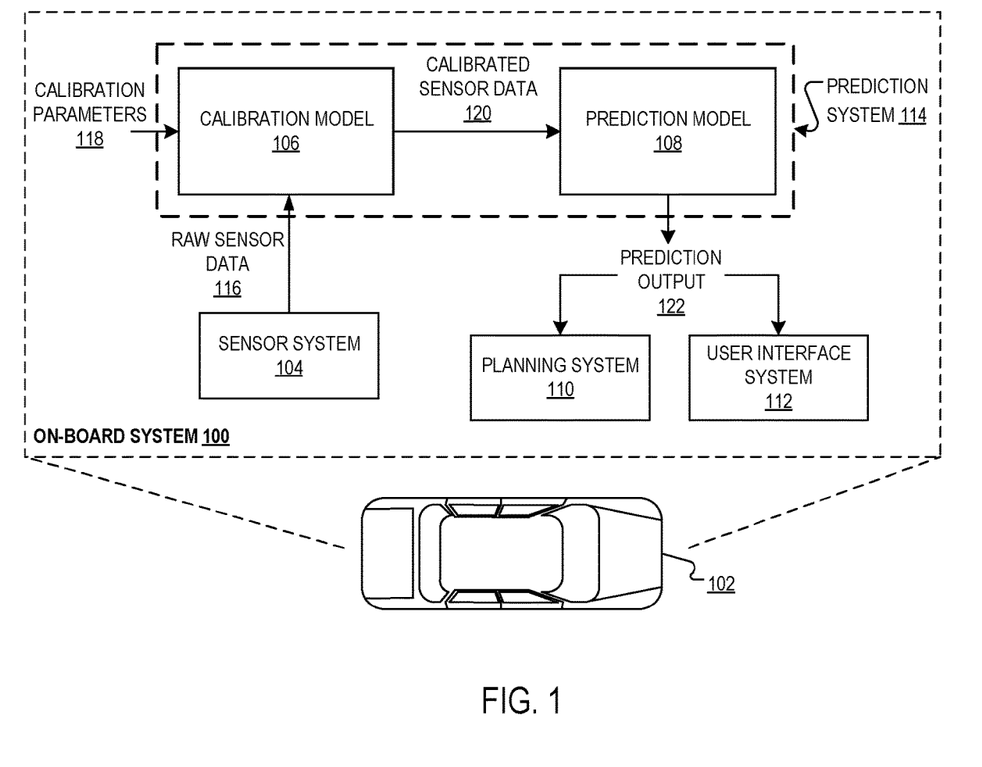
FIG. 1 is a block diagram of an example on-board system.

FIG. 1 is a block diagram of an example on-board system 100. The on-board system 100 is composed of hardware and software components, some or all of which are physically located on-board a vehicle 102. In some cases, the on-board system 100 can generate planning decisions which plan the future trajectory of the vehicle 102, present information to the driver of the vehicle 102 to assist the driver in operating the vehicle safely, or both. For example, in response to determining that the trajectory of another vehicle is likely to cross the trajectory of the vehicle 102, the on-board system 100 may generate planning decisions which adjust the future trajectory of the vehicle 102 to avoid a collision (e.g., by braking). As another example, in response to determining that the trajectory of another vehicle is likely to cross the trajectory of the vehicle 102, the on-board system 100 may present an alert message which prompts the driver of the vehicle 102 to adjust the trajectory of the vehicle 102 to avoid a collision.

Although the vehicle 102 in FIG. 1 is depicted as an automobile, and the examples in this specification are described with reference to automobiles, in general the vehicle 102 can be any kind of vehicle. For example, besides an automobile, the vehicle 102 can be a watercraft or an aircraft. Moreover, the on-board system 100 can include components additional to those depicted in FIG. 1 (e.g., a collision detection system or a navigation system).

The on-board system 100 includes a sensor system 104, a calibration model 106, a prediction model 108, a planning system 110, and a user interface system 112. The calibration model 106 and the prediction model 108 are jointly referred to as the prediction system 114.

The sensor system 104 enables the on-board system 100 to "see" the environment in the vicinity of the vehicle 102. More specifically, the sensor system 104 includes one or more sensors, for example, lidar sensors, radar sensors, or camera sensors. The sensor system 104 continually (i.e., at each of multiple time points) generates raw sensor data 116.

For example, a lidar sensor may generate raw sensor data 116 that includes time of flight data, intensity data, pitch angle data, and motor angle data.

The time of flight data defines a duration of time (e.g., measured in nano-seconds) that elapses between: (i) when the lidar sensor transmits a pulse of light, and (ii) when the reflection of the pulse of light is detected by the lidar sensor. The time of flight data characterizes the distance between the lidar sensor and points on surfaces in the environment.

The intensity data defines a strength of the reflection of the pulse of light detected by the lidar sensor, which characterizes a reflectivity of the surface in the environment which reflected the pulse of light.

The pitch angle data defines an elevation angle (e.g., relative to a predetermined baseline elevation angle) of the lidar sensor.

The motor angle data defines a rotation angle (e.g., relative to a predetermined baseline rotation angle) of the lidar sensor about a vertical axis.

Raw sensor data generated by a sensor can be represented in any appropriate numerical format, for example, as an ordered collection of numerical values (e.g., a vector or matrix of numerical values).

Generally, raw sensor data generated by different sensors (or by the same sensor at different time points) may not be directly comparable. For example, two different sensors (e.g., lidar sensors) placed in the same environment may generate substantially different raw sensor data (i.e., raw sensor data with different values). The raw sensor data generated by a sensor depends on factors specific to the sensor, for example, the temperature of the sensor, the implementation of the hardware and software components of the sensor, the age and condition of the hardware components of the sensor, the mounting position of the sensor (e.g., on the vehicle 102), and the like. When any of these factors change or differ between sensors, the raw sensor data will generally also change, even if the sensor is measuring the same scene in the environment, i.e., even if the environment that the sensor is measuring does not change.

The calibration model 106 is configured to process raw sensor data 116 generated by a sensor and a set of sensor calibration parameters 118 of the sensor to generate calibrated sensor data 120. In contrast to the raw sensor data 116, the calibrated sensor data 120 is "standardized", that is, the calibrated sensor data 120 is comparable between different sensors and different time points. The calibrated sensor data 120 can be represented in any appropriate numerical format, for example, as an ordered collection of numerical values (e.g., a vector or matrix of numerical values).

In one example, the calibrated sensor data 120 corresponding to raw sensor data 116 generated by a lidar sensor may include a "world-space" point cloud and a set of calibrated intensity data. The world-space point cloud refers to a collection of data points which each represent the position of a respective point on a surface in the environment in the vicinity of a vehicle (e.g., a point on the surface of a car, pedestrian, road sign, or building). For example, each data point may be represented as a set of x-y-z coordinates in a standardized coordinate frame centered on the vehicle 102. The set of calibrated intensity data includes a respective intensity value for each data point in the world-space point cloud. The intensity value for a data point in the world-space point cloud represents a standardized (i.e., consistent) measurement of the reflectivity of the material at the position in the environment defined by the data point.

The sensor calibration parameters 118 of a sensor may include a set of "extrinsic" sensor calibration parameters and a set of "intrinsic" sensor calibration parameters.

The extrinsic sensor calibration parameters define the position and orientation of the sensor (e.g., on the vehicle 102). For example, the extrinsic sensor calibration parameters may be represented by a three-dimensional (3D) mounting position vector that represents the mounting position of the sensor and a 3D mounting orientation vector that represents the mounting orientation of the sensor.

The intrinsic sensor calibration parameters characterize one or more internal properties of the hardware and software components of the sensor. For example, the intrinsic sensor calibration parameters may include a temperature parameter that defines the temperature (e.g., measured in degrees Fahrenheit) of a component of the sensor. As another example, the intrinsic sensor calibration parameters may include intensity calibration parameters that define the coefficients of a polynomial model (e.g., a quadratic model) that converts raw intensity values into calibrated intensity values. As another example, the intrinsic sensor calibration parameters for a camera sensor may include one or more of: a focal length parameter, a principal point parameter, radial distortion coefficients of a polynomial model describing the barrel/pincushion distortion of the camera, and a matrix of color correction parameters that characterize how the color sensitivity of the camera relates to a reference color space. As another example, the intrinsic sensor calibration parameters for a lidar sensor may include one or more of: beam angle parameters characterizing the orientation of each beam (e.g., along which the lidar transmits pulses of light) in the coordinate frame of the sensor, receiver parameters corresponding to coefficients of an analytical model that characterizes non-linearities in the receiver (e.g., in the intensity measurements made by the receiver), and parameters for adjusting time of flight measurements for reflections from highly reflective surfaces. The sensor calibration parameters 118 can be represented in any appropriate format, for example, as an ordered collection of numerical values (e.g., a vector or matrix of numerical values).

Any appropriate sensor calibration procedure can be used to determine the values of the sensor calibration parameters 118 of a sensor. Certain sensor calibration parameter values (e.g., temperature calibration parameter values) may be directly measured. Other sensor calibration parameter values may be determined by optimizing the sensor calibration parameter values to cause the calibrated sensor data generated by the calibration model 106 to match a set of "target" calibrated sensor data.

For example, the sensor calibration procedure for a lidar sensor may be initiated by positioning the lidar sensor in a controlled environment, that is, an environment where the geometry and reflectivity of the surfaces in the environment are known (e.g., a chamber in a testing facility). In this example, the known geometry and reflectivity of the controlled environment define the target calibrated sensor data that should be generated by the calibration model 106.

Generally, the calibration model 106 is implemented as a "differentiable" model. That is, the gradient of the output of the calibration model (i.e., the calibrated sensor data 120) can be computed with respect to the inputs to the calibration model 106 (i.e., the calibration parameters 118 and the raw sensor data 116). The numerical operations implemented by the calibration model 106 may be determined based on the physical principles which govern the relationships between the raw sensor data, the calibration parameters, and the calibrated sensor data. For example, as described earlier, the calibration model 106 may generate calibrated lidar sensor data which includes a world-space point cloud and a set of calibrated intensity data. In this example, the calibration model 106 can generate a data point in the world-space point cloud by projecting a 3D point by a distance defined by the speed of light and the time of flight of a pulse of light transmitted by the lidar. The calibration model 106 can project the 3D point in a direction defined by the pitch angle and rotation angle of the lidar when it transmitted the pulse of light. As another example, the calibration model 106 can generate a calibrated lidar intensity value by scaling a corresponding raw intensity measurement by a temperature calibration parameter to account for variations in intensity measurements generated by the lidar due to the temperature of the lidar. As another example, the calibration model 106 can generate a calibrated color image by applying a 3D matrix of color correction parameters to respective 3D vectors defining the color of each pixel of a raw image.

The prediction model 108 is a neural network model (e.g., a convolutional neural network) that is configured to process an input including the calibrated sensor data 120 to generate a prediction output 122. The prediction output 122 may be a classification output, a regression output, or a combination thereof, that characterizes any aspect of the environment. A classification output refers to an output that can have only a finite number of possible values. A regression output refers to an output that can have infinitely many possible values. For example, the prediction output 122 may be a classification output that defines a predicted type of an agent in the vicinity of the vehicle (e.g., animal, car, truck, pedestrian, and the like). As another example, the prediction output 122 may be a classification output that defines a predicted type of a road sign in the vicinity of the vehicle (e.g., stop sign, yield sign, and the like). As another example, the prediction output 122 may be a regression output that defines a predicted future speed of an agent (e.g., vehicle or pedestrian) in the vicinity of the vehicle 102 (e.g., in miles-per-hour (MPH)). As another example, the prediction output 122 may be a regression output that defines the coordinates of the vertices of bounding boxes that enclose objects depicted by the calibrated sensor data 120. In this example, the calibrated sensor data 120 may include a calibrated color image and a calibrated depth image generated by the calibration model 106 by processing raw sensor data generated by a camera sensor and a lidar sensor respectively. The calibrated color image and the calibrated depth image can be represented as a "stack" (i.e., a concatenated set) of "channels", where each channel is represented as a two-dimensional (2D) array of numerical values. The coordinates of the bounding boxes may be in a 2D frame of reference of the channels of the calibrated sensor data 120.

The prediction model 108 can have any appropriate neural network "architecture". The architecture of a neural network refers to: the number of layers of the neural network, the operations performed by each of the layers (e.g., including the type of each of the layers), and the connectivity between the layers (i.e., which layers receive inputs from which other layers). In one example, the prediction output 122 may be a classification output, and the prediction model 108 may have an output layer with a respective neuron corresponding to each possible value of the classification output. In this example, the activation of a neuron of the output layer defines the probability that the classification output has the possible value corresponding to the neuron. In another example, the prediction output 122 may be a regression output, and the prediction model 108 may have an output layer with a respective neuron corresponding to each component of the regression output. In this example, the activation of a neuron of the output layer defines the value of the corresponding component of the regression output.

A sensitivity analysis system can be used to determine whether the prediction outputs generated by the prediction system 114 are sensitive to variations in the values of the sensor calibration parameter values provided as an input to the prediction system 114. An example sensitivity analysis system is described in more detail with reference to FIG. 2.

The values of the "weights" (i.e., trainable parameters) of the prediction model 108 can be determined using a training system. An example training system is described in more detail with reference to FIG. 3.

The on-board system 100 can provide the prediction outputs 122 generated by the prediction model 108 to a planning system 110, a user interface system 112, or both.

When the planning system 110 receives the prediction output 122, the planning system 110 can use the prediction output 122 to generate planning decisions which plan the future trajectory of the vehicle 102. The planning decisions generated by the planning system 110 can include, for example: yielding (e.g., to pedestrians), stopping (e.g., at a Stop sign), passing other vehicles, adjusting vehicle lane position to accommodate a bicyclist, slowing down in a school or construction zone, merging (e.g., onto a highway), and parking. In a particular example, the on-board system 100 may provide the planning system 110 with a prediction output 122 that identifies a Stop sign on the future trajectory of the vehicle. In this example, the planning system 110 can generate a planning decision to apply the brakes of the vehicle 102.

The planning decisions generated by the planning system 110 can be provided to a control system of the vehicle 102. The control system of the vehicle can control some or all of the operations of the vehicle by implementing the planning decisions generated by the planning system 110. For example, in response to receiving a planning decision to apply the brakes of the vehicle, the control system may transmit an electronic signal to a braking control unit of the vehicle. In response to receiving the electronic signal, the braking control unit can mechanically apply the brakes of the vehicle.

When the user interface system 112 receives the prediction outputs 122, the user interface system 112 can use the prediction outputs 122 to present information to the driver of the vehicle 102 to assist the driver in operating the vehicle 102 safely. The user interface system 112 can present information to the driver of the vehicle 102 by any appropriate means, for example, by an audio message transmitted through a speaker system of the vehicle 102 or by alerts displayed on a visual display system in the vehicle (e.g., an LCD display on the dashboard of the vehicle 102). In a particular example, the on-board system 100 may provide the user interface system 112 with prediction outputs 122 that identify a Stop sign on the future trajectory of the vehicle 102. In this example, the user interface system 112 can present an alert message to the driver of the vehicle 102 indicating the presence of the Stop sign (e.g., in response to determining that the driver of the vehicle 102 may be unaware of the Stop sign).

Figure 2:
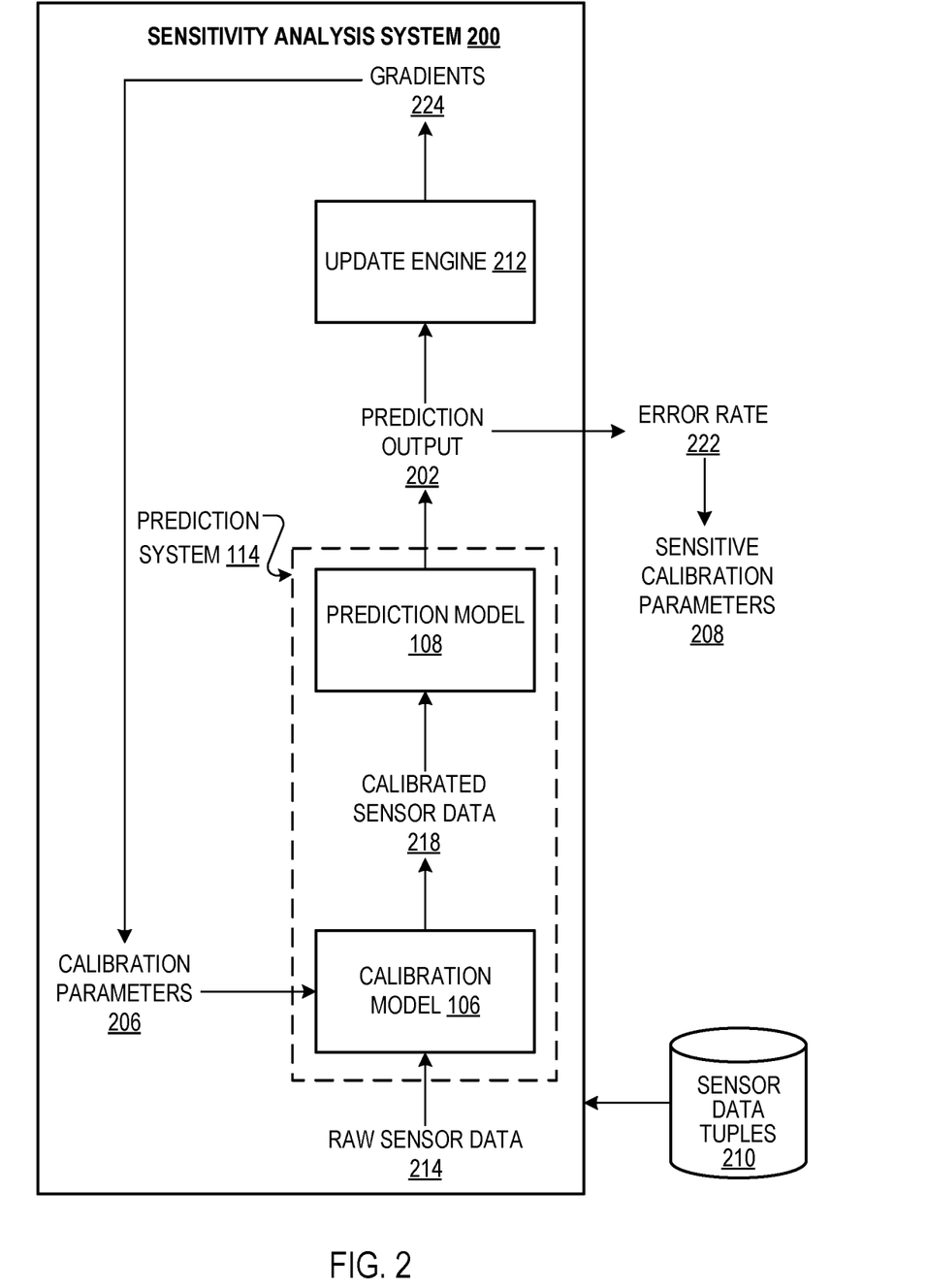
FIG. 2 is a block diagram of an example sensitivity analysis system.

FIG. 2 is a block diagram of an example sensitivity analysis system 200. The sensitivity analysis system 200 is an example of a system implemented as computer programs on one or more computers in one or more locations in which the systems, components, and techniques described below are implemented.

The sensitivity analysis system 200 is configured to determine whether prediction outputs 202 generated by the prediction system 114 (i.e., of the on-board system 100) are sensitive to variations in the values of the sensor calibration parameter values 206 provided as an input to the prediction system 114. In particular, the sensitivity analysis system 200 identifies sensitive sensor calibration parameters 208 having the property that "small" changes in the value of the sensor calibration parameter potentially cause "significant" changes in the prediction outputs generated by the prediction system.

The sensitivity analysis system 200 identifies the sensitive calibration parameters 208 by processing a set of multiple sensor data tuples 210. Each sensor data tuple 210 includes: (i) raw sensor data, and (ii) values of the sensor calibration parameters of the sensor that generated the raw sensor data at the time that the raw sensor data was generated. Examples of raw sensor data and sensor calibration parameters are described in more detail with reference to FIG. 1.

The sensitivity analysis system 200 includes the prediction system 114 and an update engine 212.

At each of one or more iterations, the sensitivity analysis system 200 is configured to process the raw sensor data 214 and the calibration parameters 206 included in each sensor data tuple 210 using the prediction system 114 to generate a corresponding prediction output 202. The prediction system 114 is configured to process the raw sensor data 214 and the calibration parameters 206 using the calibration model 106 to generate calibrated sensor data 218, and thereafter process the calibrated sensor data 218 using the prediction model 108 to generate the prediction output 202. For convenience, the prediction outputs 202 generated for sensor data tuples 210 at the first iteration are referred to in this specification as the "original" prediction outputs.

At each iteration, the update engine 212 is configured to incrementally adjust the current values of the sensor calibration parameters 206 included in each sensor data tuple 210 to increase an "error rate" 222 of the prediction system 114 at the next iteration. The error rate 222 of the prediction system 114 at an iteration refers to the fraction of the sensor data tuples 210 for which the current prediction output for the sensor data tuple at the iteration is "different" than the original prediction output for the sensor data tuple.

The sensitivity analysis system 200 can determine that two prediction outputs are "different" in any of a variety of ways.

In one example, the prediction outputs may be classification prediction outputs that include a respective probability for each of a set of possible classification values. In this example, a first prediction output can be considered to be different than a second prediction output if the classification value with the highest probability in the first prediction output is different than the classification value with the highest probability value in the second prediction output. Also in this example, the first and second prediction outputs can be considered to be different if a similarity measure (e.g., based on a Kullback-Leibler divergence) between the respective probability distributions over possible classification values defined by the first and second prediction outputs is below a predetermined threshold.

In another example, the prediction outputs may be regression outputs represented by respective numerical values. In this example, a first prediction output can be considered to be different than a second prediction output if they differ by more than a predetermined threshold value.

To adjust the current values of the sensor calibration parameters 206 included in a sensor data tuple 210, the update engine 212 determines a gradient 224 of a function of the current prediction output 202 for the sensor data tuple 210 with respect to the sensor calibration parameters. Determining the gradient 224 of the function of the current prediction output 202 with respect to the sensor calibration parameters is possible due to the implementation of both the prediction model 108 and the calibration model 106 as differentiable models. In one example, the prediction outputs may be regression outputs represented by numerical values. In this example, the update engine 212 can directly determine the gradient of a regression output value with respect to the sensor calibration parameters. In another example, the prediction outputs may be classification outputs that include a respective probability value for each of a set of possible classification values. In this example, the update engine 212 can determine the gradient of a similarity measure function (e.g., a Kullback-Leibler similarity measure function) between: (i) the probability distribution over possible classification values defined by the current prediction output, and (ii) the probability distribution over possible classification values defined by the original prediction output.

In some cases, rather than determining the gradients 224 of the function of the current prediction outputs 202 with respect to all of the sensor calibration parameters, the update engine 212 determines the gradients 224 with respect to a predetermined proper subset of the sensor calibration parameters. For convenience, this specification will refer to the update engine 212 determining the gradients with respect to a set of "target" sensor calibration parameters. The target sensor calibration parameters may refer to as many as all of the sensor calibration parameters, or as few as one of the sensor calibration parameters. The set of target sensor calibration parameters may be specified, for example, by a user of the sensitivity analysis system 200.

The gradient 224 of a function of the prediction output 202 with respect to the target sensor calibration parameters can be represented as a vector with a dimensionality equal to the number of target sensor calibration parameters. To determine the gradient 224 of a function of a prediction output 202 with respect to the target sensor calibration parameters, the update engine 212 can determine a "first" gradient of the function of the prediction output 202 with respect to the calibrated sensor data 218 using backpropagation techniques. Next, the update engine 212 can determine a "second" gradient of the calibrated sensor data 218 with respect to target sensor calibration parameters using, e.g., automatic differentiation techniques, analytical differentiation techniques, or finite difference differentiation techniques. Finally, the update engine 212 can determine the overall gradient 224 by composing the first and second gradients in accordance with the chain rule.

After determining the gradient 224 of a function of a prediction output 202 with respect to the target sensor calibration parameters, the update engine 212 updates the current values of the target sensor calibration parameters using the gradient 224. For example, the update engine 212 may update the current values of the target sensor calibration parameters by:

$$T_n = T_{n-1} + r \cdot \nabla p \quad (1)$$

where $T_n$ are the updated values of the target sensor calibration parameters, $T_{n-1}$ are the previous values of the target sensor calibration parameters, r is a learning rate parameter, and $\nabla p$ is the gradient of the function of the prediction output with respect to the target sensor calibration parameters. The update engine 212 can use any appropriate value of the learning rate parameter.

At each iteration, the sensitivity analysis system 200 determines the error rate 222 of the current prediction outputs 202. To determine the error rate 222, the sensitivity analysis system 200 can divide: (i) the number of sensor data tuples 210 for which the current prediction output for the sensor data tuple at the iteration is different than the original prediction output for the sensor data tuple, by (ii) the total number of sensor data tuples 210. As another example, the sensitivity analysis system 200 can determine the error rate 222 as the average, over the sensor data tuples 210, of a cross-entropy loss (or other appropriate loss) between the current prediction output and the original prediction output for each sensor data tuple. The error rate 222 can be represented as a numerical value (e.g., 0.23, corresponding to a 23% error rate).

In response to determining that the error rate 222 exceeds a predetermined threshold value, the sensitivity analysis system 200 identifies the current iteration as the "final" (i.e., last) iteration, and refrains from performing further iterations. Alternatively, rather than identifying the final iteration based on the error rate 222, the sensitivity analysis system 200 can identify the final iteration based on a variety of other criteria. For example, the sensitivity analysis system 200 may be configured to perform a predetermined number of iterations, and thereafter identify the last iteration of the predetermined number of iterations as the final iteration.

After the final iteration, the sensitivity analysis system 200 identifies the sensitive calibration parameters 208. For example, to determine whether a target calibration parameter is a sensitive calibration parameter 208, the sensitivity analysis system 200 can determine an average (i.e., over the sensor data tuples 210) of the change in the magnitude of the value of the calibration parameter between the first and final iteration. In a particular example, the sensitivity analysis system 200 can determine the average change in the magnitude of the value of the i-th calibration parameter as:

$$\frac{1}{|S|} \sum_{s=1}^{S} |p_s^N[i] - p_s^0[i]| \qquad (2)$$

where |S| is the total number of sensor data tuples, the sum is over each sensor data tuple indexed by s, $p_s^N[i]$ is the value of the i-th calibration parameter of the s-th sensor data tuple at the final iteration (i.e., iteration "N"), and $p_s^0[i]$ is the value of the i-th calibration parameter of the s-th sensor data tuple at the first iteration (i.e., iteration "0"). The sensitivity analysis system 200 may identify the target calibration parameter as a sensitive calibration parameter 208 if the average change in the magnitude of the target calibration parameter is below a predetermined threshold. Intuitively, the average change in the magnitude of the target calibration parameter being below the predetermined threshold indicates that "small" changes in the value of the target calibration parameter cause "substantial" changes in the prediction outputs generated by the prediction system 114. In some cases, the sensitivity analysis system 200 may determine that none of the target calibration parameters are sensitive calibration parameters 208, while in other cases, the sensitivity analysis system 200 may determine that some or all of the target calibration parameters are sensitive calibration parameters 208.

Based on the sensitivity analysis system 200 identifying one or more sensitive calibration parameters 208, a training system can re-train the weight values of the prediction model 108 to cause the prediction model 108 to be more robust to variations in the values of the sensitive calibration parameters 208. An example training system is described in more detail with reference to FIG. 3. Alternatively or in combination, the sensor calibration procedure used to determine the sensor calibration values of the sensor can be modified to determine the values of the sensitive sensor calibration parameters more precisely, while allowing the values of the non-sensitive sensor calibration parameters to be determined less precisely.

Figure 3:
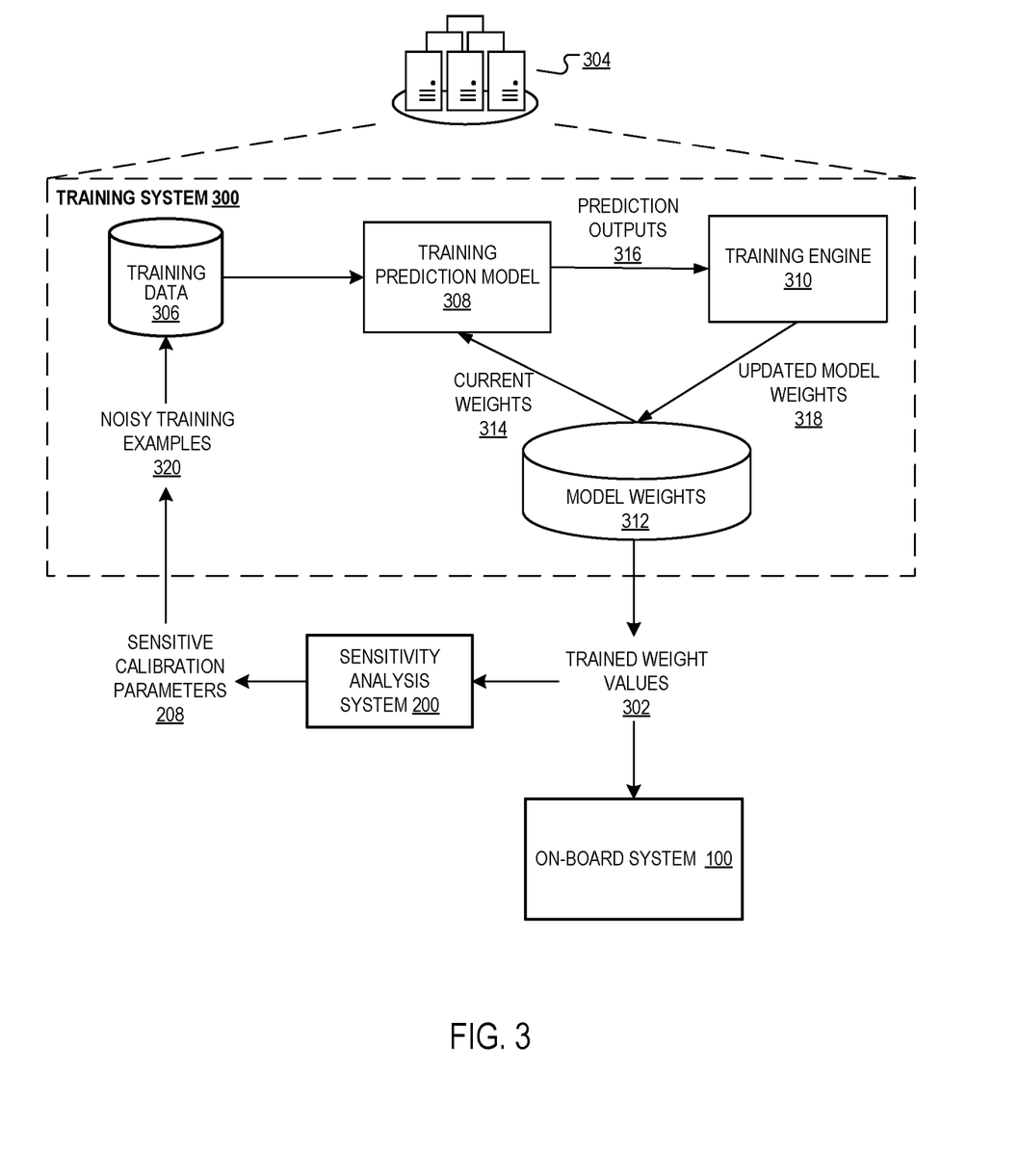
FIG. 3 is a block diagram of an example training system.

FIG. 3 is a block diagram of an example training system 300. The training system 300 is an example of a system implemented as computer programs on one or more computers in one or more locations in which the systems, components, and techniques described below are implemented.

To enable the on-board prediction model to generate accurate prediction outputs (i.e., prediction outputs which accurately characterize the environment), the training system 300 can determine trained values 302 of the weights of the prediction model. The weights of the prediction model refer to the trainable parameters of the prediction model (e.g., weight matrices and bias vectors which define operations performed by the layers of the prediction model).

The training system 300 is typically hosted within a data center 304, which can be a distributed computing system having hundreds or thousands of computers in one or more locations.

The training system 300 includes a set of training data 306, a training prediction model 308, a training engine 310, and a set of model weights 312 of the training prediction model 308.

The training system 300 determines the trained weight values 302 of the prediction model using the set of training data 306. The training data 306 includes multiple training examples which each include: (i) calibrated sensor data, and (ii) a target prediction output that should be generated by the prediction model by processing the calibrated sensor data of the training example.

The target prediction outputs of the training examples can be generated in any appropriate manner. For example, the target prediction output corresponding to a set of calibrated sensor data can be obtained by manual human annotation. As another example, the target prediction output corresponding to a set of calibrated sensor data can be obtained using an automated method. In a particular example, the target prediction output corresponding to given calibrated sensor data may be the future speed of an agent in the vicinity of a vehicle. In this example, an automated method can generate the target prediction output by processing subsequent calibrated sensor data generated after the given calibrated sensor data to determine the future speed of the agent.

The calibrated sensor data of a training example may be generated by processing: (i) raw sensor data generated by a sensor of a vehicle, and (ii) the values of the calibration parameters of the sensor that generated the raw sensor data, using the calibration model. The training system 300 may obtain the raw sensor data and the sensor calibration parameter values from a data log (e.g., a physical data storage device or logical data storage area) that is configured to store raw sensor data and sensor calibration parameter values generated by one or more vehicles.

The training prediction model 308 is a neural network model with substantially the same neural network architecture as the on-board prediction model. The training prediction model 308 is configured to process calibrated sensor data in accordance with current values of the model weights 314 of the training prediction model 308 to generate corresponding prediction outputs 316. The training engine 310 is configured to train the training prediction model 308 on the set of training data 306 by iteratively updating the values of the model weights 312 of the training prediction model 308 over multiple training iterations. To update the values of the model weights 312 at a training iteration, the training engine 310 selects a batch (i.e., a set) of training examples from the training data 306 (e.g., by randomly sampling a predetermined number of training examples from the training data 306). Next, the training engine 310 processes the calibrated sensor data included in each training example in the current batch using the training prediction model 308, in accordance with the current values of the model weights 314, to generate corresponding prediction outputs 316.

After generating the prediction outputs 316 for the current batch of training examples, the training engine 310 determines gradients of an objective function with respect to the model weights 312 (e.g., using backpropagation), and uses the gradients to determine updated values of the model weights 318. Generally, the objective function compares the prediction outputs 316 generated by the training prediction model 308 to the target prediction outputs specified by the training examples. For example, if the prediction outputs are classification outputs, then the objective function may be a cross-entropy loss between the prediction outputs generated by the training prediction model 308 and the corresponding target prediction outputs. As another example, if the prediction outputs are regression outputs, then the objective function may be a squared-error loss between the prediction outputs generated by the training prediction model 308 and the corresponding target prediction outputs. The training engine 310 may use the gradients of the objective function to determine updated values of the model weights 318 using any appropriate gradient descent optimization algorithm (e.g., RMSprop or Adam).

The training system 300 may determine the trained weight values 302 of the on-board prediction model by performing multiple training iterations using training examples which each include: (i) calibrated sensor data, and (ii) a target prediction output. Prior to providing the trained weight values 302 to the on-board system 100, the training system 300 may provide the trained weight values 302 to the sensitivity analysis system 200. As described with reference to FIG. 2, the sensitivity analysis system 200 is configured to identify one or more sensitive calibration parameters 208 of the prediction system 114.

The training system 300 can adjust the trained weight values 302 to enable the prediction system 114 to be more "robust" to variations in the values of the sensitive sensor calibration parameters 208. The prediction system 114 is said to be more robust to variations in the values of a calibration parameter if the value of the calibration parameter exerts less influence on prediction outputs generated by the prediction system 114. By making the prediction system 114 more robust, the training system 300 increases the likelihood that the prediction system 114 will generate accurate prediction outputs, even if the sensor calibration parameters processed by the prediction system 114 are inaccurate (e.g., due to the sensor system 104 being poorly calibrated).

To make the prediction system 114 more robust to variations in the values of the sensitive sensor calibration parameters 208, the training system 300 can generate a set of "noisy" training examples 320 (i.e., as a form of training data augmentation). Each noisy training example includes: (i) "noisy" sensor data, and (ii) a target prediction output that should be generated by the prediction model by processing the noisy sensor data of the training example. The training system 300 can generate noisy sensor data by using the calibration model 106 to process: (i) raw sensor data generated by a sensor of a vehicle, and (ii) a set of "noisy" calibration parameter values. The training system 300 can generate the noisy calibration parameter values by adding respective random noise values (e.g., drawn from a predetermined probability distribution) to the values of the sensitive calibration parameters of the sensor that generated the raw sensor data.

After generating the noisy training examples 320, the training system 300 can adjust the current trained weight values 302 by training the training prediction model 308 on the noisy training examples 320 for one or more additional training iterations. Thereafter, the training system 300 can provide the trained weight values 302 after the final training iteration on the noisy training examples 320 to the on-board system 100. The training system 300 can provide the set of trained weight values 302 to the on-board system 100 by a wired or wireless connection to the on-board system 100.

Figure 4:
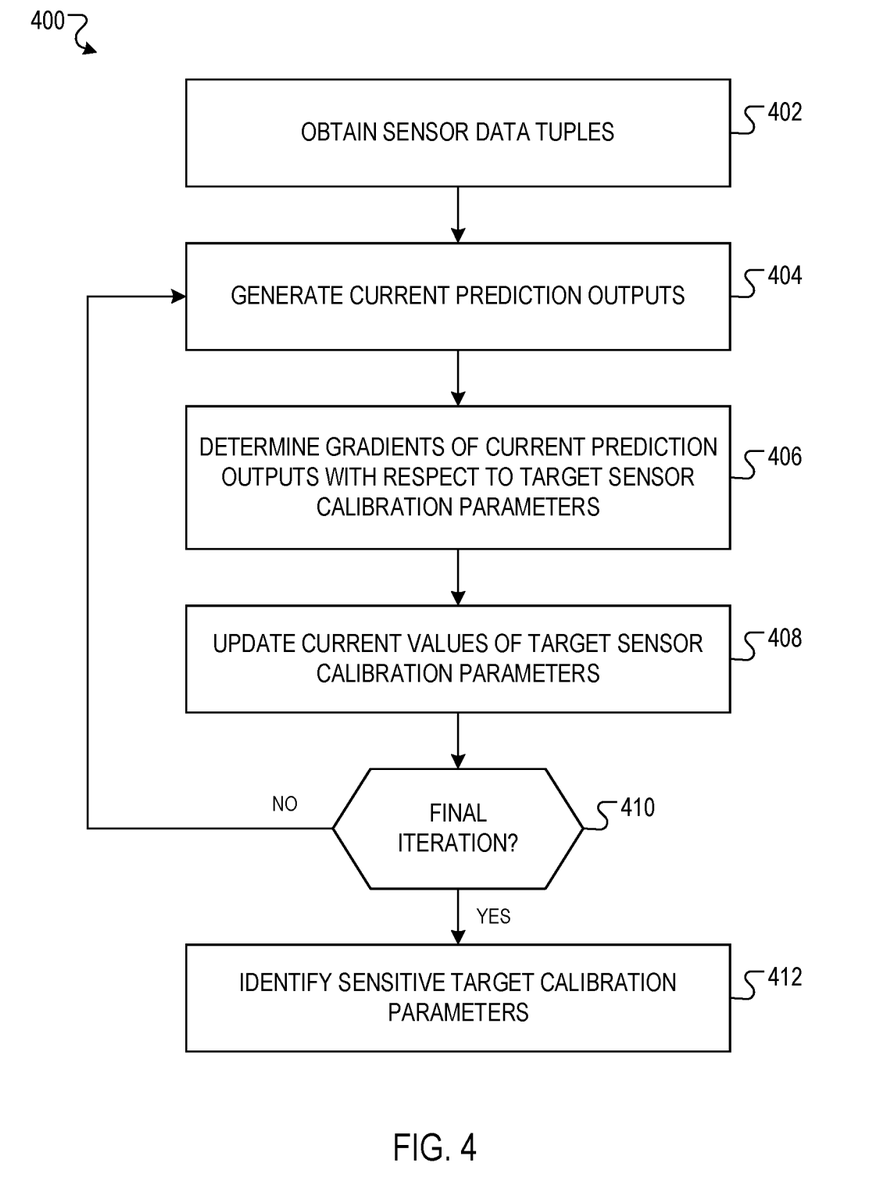
FIG. 4 is a flow diagram of an example process for identifying sensitive calibration parameters.
Like reference numbers and designations in the various drawings indicate like elements.

FIG. 4 is a flow diagram of an example process 400 for identifying sensitive sensor calibration parameters. For convenience, the process 400 will be described as being performed by a system of one or more computers located in one or more locations. For example, a sensitivity analysis system, e.g., the sensitivity analysis system 200 of FIG. 2, appropriately programmed in accordance with this specification, can perform the process 400.

The system obtains a set of multiple sensor data tuples (402). Each sensor data tuple includes: (i) a set of raw sensor data, and (ii) actual values of a set of sensor calibration parameters of a sensor that generated the raw sensor data. In one example, the raw sensor data is generated by a lidar sensor and includes one or more of: raw time of flight data, raw intensity data, raw lidar beam pitch angle data, and raw lidar motor angle data.

The steps 404-410 of the process 400 are performed for one or more iterations. At each iteration, the system updates the values of one or more "target" sensor calibration parameters (e.g., that are specified by a user of the system) of each sensor data tuple. For convenience, steps 404-410 are described with reference to a particular current iteration.

For each sensor data tuple, the system processes the sensor data tuple using a prediction system to generate a current prediction output (404). The prediction system processes the raw sensor data and the values of the set of sensor calibration parameters of the sensor data tuple using a calibration model to generate a set of calibrated sensor data. Then, the prediction system processes the set of calibrated sensor data using a prediction model to generate the current prediction output for the sensor data tuple. The prediction model may be, e.g., a neural network model. In one example, the raw sensor data of the sensor data tuple is generated by a lidar sensor, and the calibrated sensor data includes world-space position data, calibrated intensity data, or both. The prediction output may identify, e.g., positions of objects characterized by the raw sensor data of the sensor data tuple.

For each sensor data tuple, the system determines a gradient of a function of the current prediction output for the sensor data tuple with respect to the target sensor calibration parameters (406). For example, the system may determine a gradient of a similarity measure function between: (i) the current prediction output for the sensor data tuple and (ii) an original prediction output generated by providing the sensor data tuple with the actual values of the target sensor calibration parameters to the prediction system. In a particular example, the current prediction output and the original prediction output may be respective probability distributions over possible classification values, and the similarity measure function may be a Kullback-Leibler (KL) similarity measure.

For each sensor data tuple, the system updates the current values of the target sensor calibration parameters of the sensor data tuple using the gradient of the function of the current prediction output for the sensor data tuple (408). For example, the system may update the current values of the target sensor calibration parameters based on any appropriate gradient descent optimization algorithm, e.g., RMSprop or Adam.

The system determines whether the current iteration is the final (i.e., last) iteration (410). In one example, the system determines that the current iteration is the final iteration if, for at least a predetermined number of the sensor data tuples, the current prediction output for the sensor data tuple is different than an "original" prediction output for the sensor data tuple. The original prediction output for a sensor data tuple refers to the prediction output generated by providing the sensor data tuple with the actual values of the target sensor calibration parameters to the prediction system. The predetermined number of sensor data tuples may be, e.g., a predetermined fraction (e.g., 50%) of the total number of sensor data tuples.

In response to determining that the current iteration is not the final iteration, the system returns to step 404 of the process 400.

In response to determining that the current iteration is the final iteration, the system determines that prediction outputs generated by the prediction system are sensitive to variations in the values of one or more of the target sensor calibration parameters based on the current values of the target sensor calibration parameters (412). That is, the system identifies one or more "sensitive" target calibration parameters. The system may identify a particular target sensor calibration parameter as a sensitive parameter based on, for each sensor data tuple, a difference between (i) the current value of the particular target sensor calibration parameter of the sensor data tuple and (ii) the actual value of the particular target sensor calibration parameter of the sensor data tuple. In one example, the system may identify a particular target sensor calibration parameter as a sensitive parameter if an average, over the sensor data tuples, of a magnitude of a difference between (i) the current value of the particular target sensor calibration parameter of the sensor data tuple and (ii) the actual value of the particular target sensor calibration parameter of the sensor data tuple, satisfies a threshold.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:
1. A system comprising:
a prediction subsystem configured to perform operations comprising:
  receiving an input sensor data tuple comprising: (i) a given set of raw sensor data, and (ii) values of a set of sensor calibration parameters; and
  processing the input sensor data tuple to generate a prediction output; and
a sensitivity analysis subsystem configured to perform operations comprising:
  obtaining a plurality of sensor data tuples, wherein each sensor data tuple comprises: (i) a set of raw sensor data, and (ii) actual values of a set of sensor calibration parameters of a sensor that generated the set of raw sensor data;
  at each of one or more iterations, updating the values of one or more target sensor calibration parameters of each sensor data tuple, comprising, for each sensor data tuple:
    providing the sensor data tuple with the current values of the target sensor calibration parameters to the prediction subsystem to generate a current prediction output;
    determining a gradient of a function of the current prediction output with respect to the target sensor calibration parameters; and
    updating the current values of the target sensor calibration parameters of the sensor data tuple using the gradient; and
  at a final iteration of the one or more iterations:

determining that prediction outputs generated by the prediction subsystem are sensitive to variations in the values of one or more of the target sensor calibration parameters based on the current values of the target sensor calibration parameters.

2. The system of claim 1, wherein the sensitivity analysis subsystem is further configured to, at the final iteration of the one or more iterations, determine that for at least a predetermined number of the sensor data tuples, the current prediction output generated by providing the sensor data tuple with the current values of the target sensor calibration parameters to the prediction subsystem is different than an original prediction output generated by providing the sensor data tuple with the actual values of the target sensor calibration parameters to the prediction subsystem.

3. The system of claim 2, wherein the predetermined number of sensor data tuples is a predetermined fraction of the plurality of sensor data tuples.

4. The system of claim 1, wherein processing the input sensor data tuple to generate a prediction output comprises:
processing the given set of raw sensor data and the values of the set of sensor calibration parameters using a calibration model to generate a set of calibrated sensor data; and
processing an input comprising the set of calibrated sensor data using a prediction model to generate the prediction output.

5. The system of claim 4, wherein the prediction model is a neural network model.

6. The system of claim 4, wherein the given set of raw sensor data is generated by a lidar sensor and comprises one or more of: raw time of flight data, raw intensity data, raw lidar beam pitch angle data, and raw lidar motor angle data.

7. The system of claim 6, wherein the set of calibrated sensor data comprises one or both of: world-space position data and calibrated intensity data.

8. The system of claim 1, wherein the prediction output is a detection output that identifies positions of objects characterized by the raw sensor data.

9. The system of claim 1, wherein determining that prediction outputs generated by the prediction subsystem are sensitive to variations in the values of one or more of the target sensor calibration parameter comprises:
determining that prediction outputs generated by the prediction system are sensitive to variations in the values of a particular target sensor calibration parameter based on, for each sensor data tuple, a difference between (i) the current value of the particular target sensor calibration parameter of the sensor data tuple and (ii) the actual value of the particular target sensor calibration parameter of the sensor data tuple.

10. The system of claim 9, wherein determining that prediction outputs generated by the prediction system are sensitive to variations in the values of a particular target sensor calibration parameter comprises:
determining that an average, over the sensor data tuples, of a magnitude of the difference between (i) the current value of the particular target sensor calibration parameter of the sensor data tuple and (ii) the actual value of the particular target sensor calibration parameter of the sensor data tuple, satisfies a threshold.

11. The system of claim 1, wherein determining a gradient of a function of the current prediction output with respect to the target sensor calibration parameters comprises:
determining a gradient of a similarity measure function between: (i) the current prediction output generated by providing the sensor data tuple with the current values of the target sensor calibration parameters to the prediction subsystem and (ii) an original prediction output generated by providing the sensor data tuple with the actual values of the target sensor calibration parameters to the prediction subsystem.

12. The system of claim 11, wherein:
the current prediction output and the original prediction output comprise respective probability distributions over possible classification values; and
the similarity measure function between the current prediction output and the original prediction output comprises a Kullback-Leibler similarity measure between the current prediction output and the original prediction output.

13. A method performed by one or more data processing apparatus, the method comprising:
obtaining a plurality of sensor data tuples, wherein each sensor data tuple comprises: (i) a set of raw sensor data, and (ii) actual values of a set of sensor calibration parameters of a sensor that generated the set of raw sensor data;
at each of one or more iterations, updating the values of one or more target sensor calibration parameters of each sensor data tuple, comprising, for each sensor data tuple:
providing the sensor data tuple with the current values of the target sensor calibration parameters to a prediction subsystem to generate a current prediction output, wherein the prediction subsystem is configured to perform operations comprising:
receiving an input sensor data tuple comprising: (i) a given set of raw sensor data, and (ii) values of a set of sensor calibration parameters; and
processing the input sensor data tuple to generate a prediction output;
determining a gradient of a function of the current prediction output with respect to the target sensor calibration parameters; and
updating the current values of the target sensor calibration parameters of the sensor data tuple using the gradient; and
at a final iteration of the one or more iterations:
determining that prediction outputs generated by the prediction subsystem are sensitive to variations in the values of one or more of the target sensor calibration parameters based on the current values of the target sensor calibration parameters.

14. The method of claim 13, further comprising:
at the final iteration of the one or more iterations, determining that for at least a predetermined number of the sensor data tuples, the current prediction output generated by providing the sensor data tuple with the current values of the target sensor calibration parameters to the prediction subsystem is different than an original prediction output generated by providing the sensor data tuple with the actual values of the target sensor calibration parameters to the prediction subsystem.

15. The method of claim 13, wherein processing the input sensor data tuple to generate a prediction output comprises:
processing the given set of raw sensor data and the values of the set of sensor calibration parameters using a calibration model to generate a set of calibrated sensor data; and
processing an input comprising the set of calibrated sensor data using a prediction model to generate the prediction output.

16. The method of claim 15, wherein the prediction model is a neural network model.

17. One or more non-transitory computer storage media storing instructions that when executed by one or more computers cause the one or more computers to perform operations comprising:
obtaining a plurality of sensor data tuples, wherein each sensor data tuple comprises: (i) a set of raw sensor data, and (ii) actual values of a set of sensor calibration parameters of a sensor that generated the set of raw sensor data;
at each of one or more iterations, updating the values of one or more target sensor calibration parameters of each sensor data tuple, comprising, for each sensor data tuple:
providing the sensor data tuple with the current values of the target sensor calibration parameters to a prediction subsystem to generate a current prediction output, wherein the prediction subsystem is configured to perform operations comprising:
receiving an input sensor data tuple comprising: (i) a given set of raw sensor data, and (ii) values of a set of sensor calibration parameters; and
processing the input sensor data tuple to generate a prediction output;
determining a gradient of a function of the current prediction output with respect to the target sensor calibration parameters; and
updating the current values of the target sensor calibration parameters of the sensor data tuple using the gradient; and
at a final iteration of the one or more iterations:
determining that prediction outputs generated by the prediction subsystem are sensitive to variations in the values of one or more of the target sensor calibration parameters based on the current values of the target sensor calibration parameters.

18. The non-transitory computer storage media of claim 17, wherein the operations further comprise:
at the final iteration of the one or more iterations, determining that for at least a predetermined number of the sensor data tuples, the current prediction output generated by providing the sensor data tuple with the current values of the target sensor calibration parameters to the prediction subsystem is different than an original prediction output generated by providing the sensor data tuple with the actual values of the target sensor calibration parameters to the prediction subsystem.

19. The non-transitory computer storage media of claim 17, wherein processing the input sensor data tuple to generate a prediction output comprises:
processing the given set of raw sensor data and the values of the set of sensor calibration parameters using a calibration model to generate a set of calibrated sensor data; and
processing an input comprising the set of calibrated sensor data using a prediction model to generate the prediction output.

20. The non-transitory computer storage media of claim 19, wherein the prediction model is a neural network model.

* * * * *